(12) United States Patent  (10) Patent No.: US 9,228,645 B2
Griffin et al.  (45) Date of Patent: *Jan. 5, 2016

(54) VACUUM STABLE MECHANISM DRIVE ARM

(71) Applicant: Raytheon Company, Waltham, MA (US)

(72) Inventors: Eric J. Griffin, Rancho Palos Verdes, CA (US); Michael L. Brest, Goleta, CA (US); Wallace H. Sunada, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/088,176

(22) Filed: Nov. 22, 2013

(65) Prior Publication Data

US 2014/0360293 A1  Dec. 11, 2014

Related U.S. Application Data

(60) Provisional application No. 61/833,599, filed on Jun. 11, 2013, provisional application No. 61/833,587, filed on Jun. 11, 2013, provisional application No. 61/833,592, filed on Jun. 11, 2013.

(51) Int. Cl.
*G03B 9/08* (2006.01)
*F16H 21/18* (2006.01)
(Continued)

(52) U.S. Cl.
CPC . *F16H 21/18* (2013.01); *F01L 9/04* (2013.01); *G03B 9/08* (2013.01); *G05B 6/02* (2013.01);
(Continued)

(58) Field of Classification Search
USPC .................................................. 396/452, 449
See application file for complete search history.

(56) References Cited

U.S. PATENT DOCUMENTS 3,082,674 A   3/1963 Bagby
3,699,863 A   10/1972 Yamamoto
(Continued)

FOREIGN PATENT DOCUMENTS

EP  2416216 A1  2/2012
GB  2 446 606 A  8/2008
(Continued)

OTHER PUBLICATIONS

United States Office Action dated Aug. 18, 2014 in connection with U.S. Appl. No. 14/091,128; 14 pages.
(Continued)

*Primary Examiner* — Clayton E LaBalle
*Assistant Examiner* — Dennis Hancock

(57) ABSTRACT

A drive mechanism including a rotary actuated motor configured to rotatably drive a drive arm between a first position to a second position and an actuator responsive to movement of the arm, wherein the actuator is thermally isolated from the arm in both the first position and the second position to create a thermal barrier. The drive arm is configured to engage and advance the actuator between the first position and the second position, while remaining physically spaced from the actuator in the first position and the second position. The drive arm includes a recess such as an opening, wherein the actuator has a member configured to reside in the recess and remain thermally isolated from the arm in both the first position and the second position. In one preferred embodiment, a shutter of an imaging device is positioned in response to the actuator, which shutter remains thermally isolated from the motor and arm. Other devices may be driven as well, such as switches.

21 Claims, 6 Drawing Sheets

(51) Int. Cl.
  *G05B 6/02* (2006.01)
  *F01L 9/04* (2006.01)
  *H01F 7/18* (2006.01)
  *G01R 31/06* (2006.01)
  *H02P 7/29* (2006.01)

(52) U.S. Cl.
  CPC .............. *H01F 7/1844* (2013.01); *G01R 31/06* (2013.01); *H02P 7/2913* (2013.01); *Y10T 74/18248* (2015.01)

(56) References Cited

U.S. PATENT DOCUMENTS

| | | | |
|---|---|---|---|
| 3,938,168 A | 2/1976 | Lange | |
| 4,121,235 A | 10/1978 | Fujita et al. | |
| 4,592,083 A | 5/1986 | O'Brien | |
| 4,995,700 A | 2/1991 | Barney et al. | |
| 5,128,796 A | 7/1992 | Barney et al. | |
| 5,402,202 A | 3/1995 | Washisu et al. | |
| 5,689,746 A | 11/1997 | Akada et al. | |
| 5,775,276 A | 7/1998 | Yanai et al. | |
| 5,991,143 A | 11/1999 | Wright et al. | |
| 6,128,175 A | 10/2000 | Wright et al. | |
| 6,133,569 A | 10/2000 | Shoda et al. | |
| 6,285,151 B1 | 9/2001 | Wright et al. | |
| 6,366,441 B1 | 4/2002 | Ozawa et al. | |
| 6,423,419 B1 | 7/2002 | Teer et al. | |
| 6,515,285 B1 | 2/2003 | Marshall et al. | |
| 6,995,359 B1 | 2/2006 | Hillenbrand et al. | |
| 7,410,310 B2 | 8/2008 | Kihara | |
| 8,164,813 B1 | 4/2012 | Gat et al. | |
| 8,911,163 B1 * | 12/2014 | Yanevich et al. | 396/449 |
| 2002/0030163 A1 | 3/2002 | Zhang | |
| 2004/0238741 A1 | 12/2004 | Gat et al. | |
| 2005/0035870 A1 | 2/2005 | Bauerle et al. | |
| 2006/0255275 A1 | 11/2006 | Garman et al. | |
| 2007/0046143 A1 | 3/2007 | Blandino et al. | |
| 2007/0279793 A1 | 12/2007 | Hansen et al. | |
| 2007/0280679 A1 | 12/2007 | Kato et al. | |
| 2008/0017816 A1 | 1/2008 | Willats et al. | |
| 2008/0030891 A1 | 2/2008 | Kim et al. | |
| 2008/0094728 A1 | 4/2008 | Matsumoto et al. | |
| 2008/0304126 A1 | 12/2008 | Powell et al. | |
| 2009/0293654 A1 | 12/2009 | Pintauro | |
| 2010/0053412 A1 | 3/2010 | Sekimoto et al. | |
| 2010/0220988 A1 | 9/2010 | Ohno | |
| 2011/0174979 A1 | 7/2011 | Garman et al. | |
| 2011/0206362 A1 | 8/2011 | Viglione et al. | |
| 2011/0211823 A1 | 9/2011 | Tsai | |
| 2011/0234892 A1 | 9/2011 | Yasuda et al. | |
| 2012/0019404 A1 | 1/2012 | Brosio | |
| 2012/0063014 A1 | 3/2012 | Terahara et al. | |
| 2012/0257099 A1 | 10/2012 | Tsai | |
| 2014/0061467 A1 | 3/2014 | Buzerak et al. | |

FOREIGN PATENT DOCUMENTS

| | | |
|---|---|---|
| JP | 2001172766 | 6/2001 |
| JP | 2007114672 A | 5/2007 |
| WO | WO 95/33226 | 12/1995 |

OTHER PUBLICATIONS

United States Notice of Allowance dated Aug. 4, 2014 in connection with U.S. Appl. No. 14/170,237; 13 pages.
International Search Report dated Nov. 12, 2014 in connection with International Application No. PCT/US2014/041769; 4 pages.
Written Opinion of International Searching Authority dated Nov. 12, 2014 in connection with International Application No. PCT/US2014/041769; 8 pages.
International Search Report dated Oct. 29, 2014 in connection with International Application No. PCT/US2014/041966; 3 pages.
Written Opinion of International Searching Authority dated Oct. 29, 2014 in connection with International Application No. PCT/US2014/041966; 4 pages.
International Search Report dated Oct. 29, 2014 in connection with International Application No. PCT/US2014/041963; 3 pages.
Written Opinion of international Searching Authority dated Oct. 29, 2014 in connection with International Application No. PCT/US2014/041963; 4 pages.
International Search Report dated Oct. 27, 2014 in connection with International Application No. PCT/US2014/042009; 3 pages.
Written Opinion of International Searching Authority dated Oct. 27, 2014 in connection with International Application No. PCT/US2014/042009; 4 pages.
Non-Final Office Action dated Dec. 4, 2014 in connection with U.S. Appl. No. 14/170,348; 17 pages.
Final Office Action dated Nov. 6, 2014 in connection with U.S. Appl. No. 13/669,996; 8 pages.
United States Office Action dated Apr. 20, 2015 in connection with U.S. Appl. No. 13/669,996; 13 pages.
United States Office Action dated May 7, 2015 in connection with U.S. Appl. No. 14/091,128; 18 pages.
Donald F. King et al., "3rd-generation MW/LWIR sensor engine for advanced tactical systems", Infrared Technology and Applications XXXIV, Proc. of SPIE, vol. 6940, 2008, 12 pages.
"Diaphragm (optics)", Wikipedia, Oct. 7, 2012, 4 pages.
"Aperture", Wikipedia, Nov. 4, 2012, 9 pages.
Kazuhisa Miyoshi; "Durability Evaluation of Selected Solid Lubricating Films", May 2001, 12 pages.
M. A. Sherbiney et al., "Friction and Wear of Ion-Plated Soft Metallic Films", Wear, 45 (1977), pp. 211-220.
S. Jahanmir, et al., "Sliding Wear Resistance of Metallic Coated Surfaces", Wear, 40 (1976), pp. 75-84.
International Search Report and Written Opinion dated Feb. 6, 2014 in connection with International Patent Application No. PCT/US2013/068649.
International Search Report and Written Opinion dated Feb. 5, 2014 in connection with International Patent Application No. PCT/US2013/068678.
International Search Report dated Oct. 27, 2014 in connection with International Patent Application No. PCT/US2014/042010.
U.S. Office Action dated May 21, 2015 in connection with U.S. Appl. No. 14/170,276; 24 pages.
U.S. Office Action dated May 7, 2015 in connection with U.S. Appl. No. 14/091,128; 24 pages.
U.S. Office Action dated Mar. 31, 2015 in connection with U.S. Appl. No. 14/170,348; 10 pages.
U.S. Office Action dated May 20, 2015 in connection with U.S. Appl. No. 14/071,970; 14 pages.
U.S. Office Action dated Apr. 20, 2015 in connection with U.S. Appl. No. 13/669,996; 13 pages.
Yukio Miyakawa, "Friction and Wear Performance of Gold and Gold Alloy Films"; National Aerospace Laboratory, Tokyo Japan; 1980; pp. 21-30.
Charles S. Clark; "Resolution for Fretting Wear Contamination on Cryogenic Mechanism"; 41st Aerospace Mechanisms Symposium, Jet Propulsion Laboratory; May 16-18, 2012; pp. 399-410.
Donald H. Buckley; "Friction, Wear, and Lubrication in Vacuum"; National Aeronautics and Space Administration; 1971; 190 pages.
U.S. Office Action dated Aug. 20, 2015 in connection with U.S. Appl. No. 13/669,996; 12 pages.
U.S. Office Action dated Aug. 24, 2015 in connection with U.S. Appl. No. 14/091,128; 23 pages.
U.S. Office Action dated Sep. 18, 2015 in connection with U.S. Appl. No. 14/170,276; 25 pages.

* cited by examiner

VACUUM STABLE MECHANISM DRIVE ARM

TECHNICAL FIELD

The present disclosure is directed in general to drive mechanisms and actuators, and more specifically to a drive arms and actuators utilized in thermally sensitive devices including but not limited to IR imaging shutters.

BACKGROUND OF THE DISCLOSURE

Drive mechanisms including actuators are conventionally utilized to control the selective positioning of one or more members of a system. System design requirements dictate, and often limit, the specific design suitable for the application. In some environments, the system member to be controlled and/or manipulated is extremely thermally sensitive, such as infrared (IR) thermal imaging systems having movable shutters, including those operating in a true IR Dewer environment operating at cryogenic temperatures. Some conventional drive mechanisms are not suitable in such thermally sensitive systems where a thermal barrier needs to be maintained between a driving actuator and the driven device, such as to minimize or avoid stress, binding, wear and inconsistent operation of the system. Other conventional drive mechanisms have unreliable and inconsistent drive paths, and difficulty of meeting or staying within design tolerances. There is desired a drive mechanism that is reliably operable in thermally sensitive systems.

SUMMARY OF THE DISCLOSURE

To address one or more of the above-deficiencies of the prior art, one embodiment described in this disclosure comprises a drive mechanism including a thermally isolated actuator reliably operable in thermally sensitive system. A drive mechanism including a rotary actuated motor is configured to rotatably drive a drive arm between a first position and a second position, wherein an actuator is responsive to movement of the arm. The actuator is thermally isolated from an actuatable member in both the first position and the second position to create a thermal barrier. The drive arm is configured to engage and advance the actuator between a first position and a second position, while remaining physically spaced from the actuator in the first position and the second position. The drive arm includes a recess, such as an opening, wherein the actuator has a member configured to reside in the recess and remain thermally isolated from the arm in both the first position and the second position. The spacing between the drive arm and the actuator also enables the drive arm to build momentum before engaging the actuator during actuation, converting the actuation mechanism from torque transfer to momentum transfer of energy. This additional momentum helps overcome magnetic detent forces of locking members, and also helps overcome any stiction that may be present. This spacing significantly increases the required force margin, and also allows the use of a less precise solenoid motor which has a relatively large amount of play. In one preferred embodiment, a shutter of an IR imaging device is positioned in response to the actuator, which shutter remains thermally isolated from the motor and arm. Other devices may be driven as well, such as switches. Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
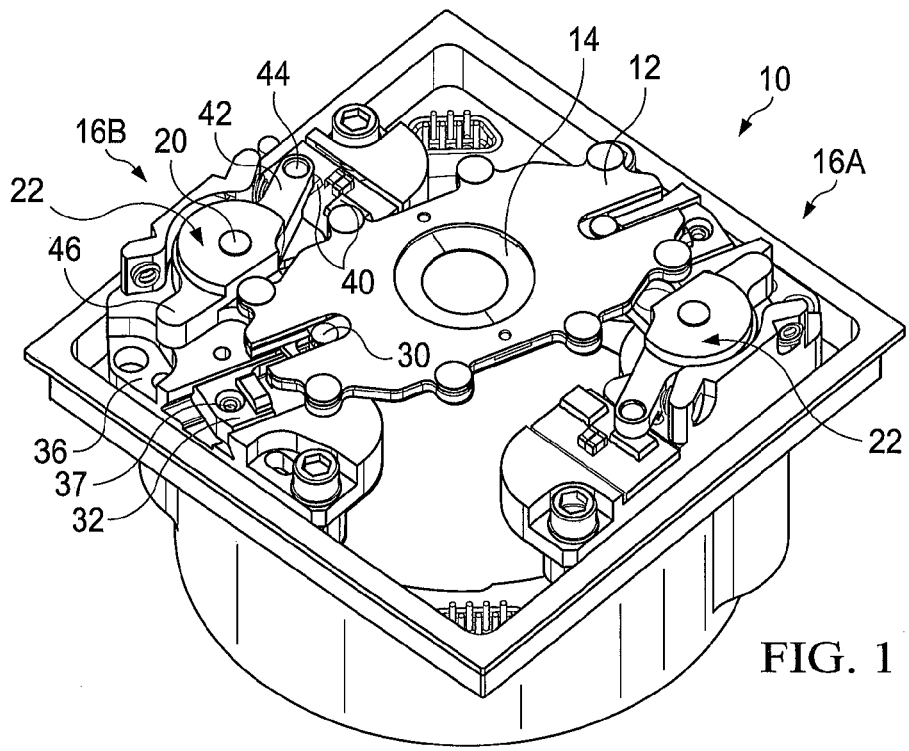
FIG. 1 illustrates a thermal imaging device including a shutter and a thermally isolated drive system configured to position the shutter according to an embodiment of the present disclosure.
Figure 2:
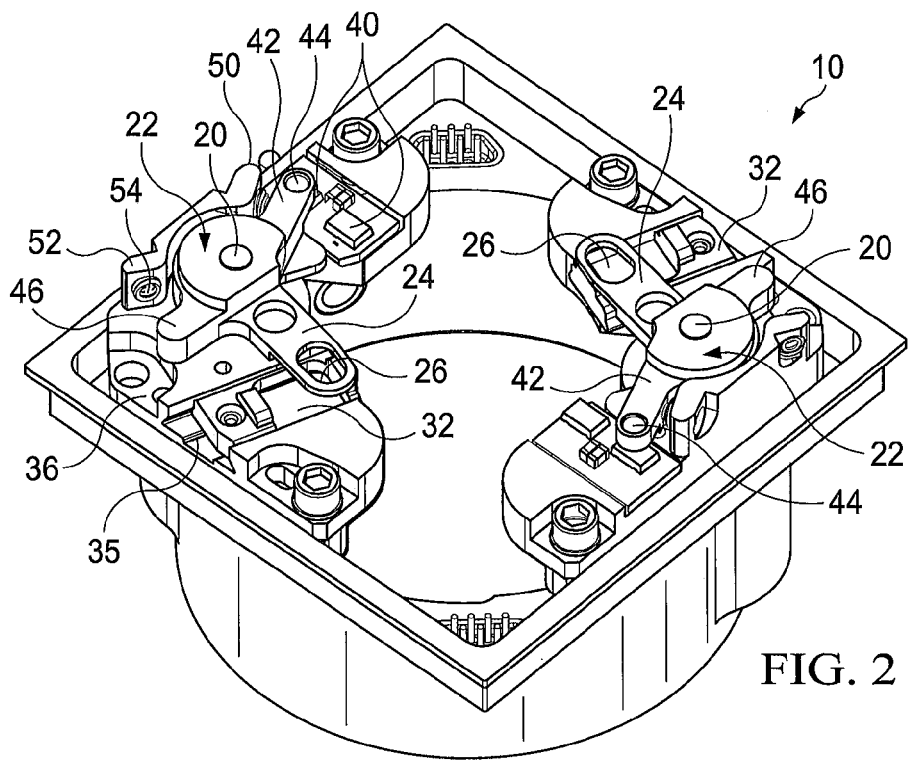
FIG. 2 illustrates the thermally isolated drive system of FIG. 1 with the shutter removed.
Figure 4:
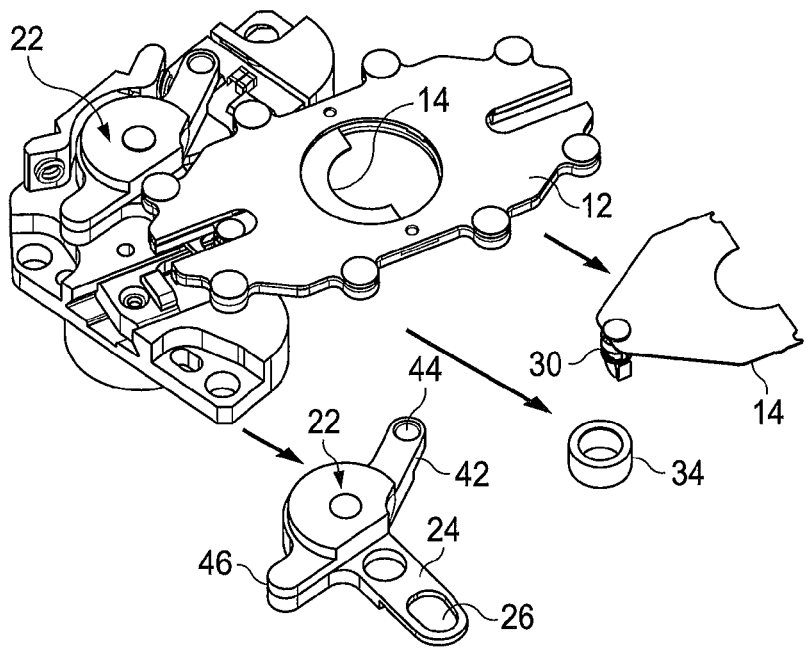
FIG. 4 illustrates an exploded view of part of the drive system illustrating the drive arm having an elongated recess configured as an opening to receive a drive pin and roller of the shutter slider member.
Figure 5:
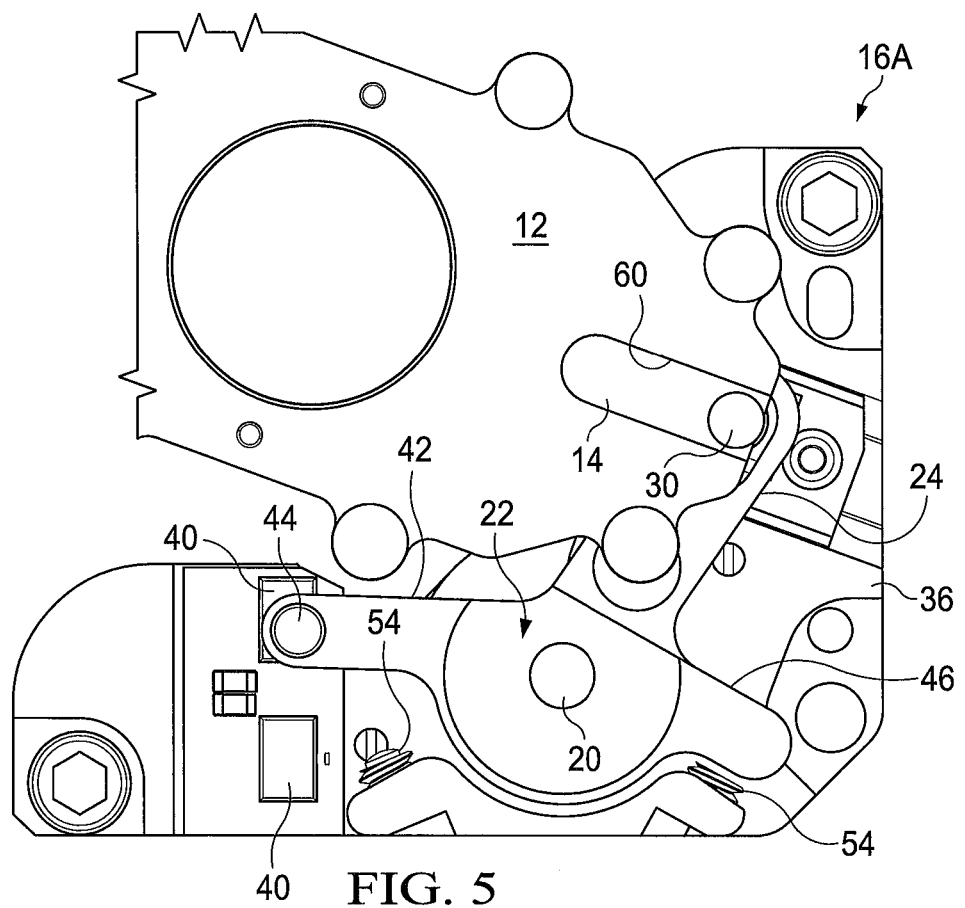
FIG. 5 illustrates the drive arm in a first "full open" position wherein the shutter slider member is in a corresponding first position.
Figure 6:
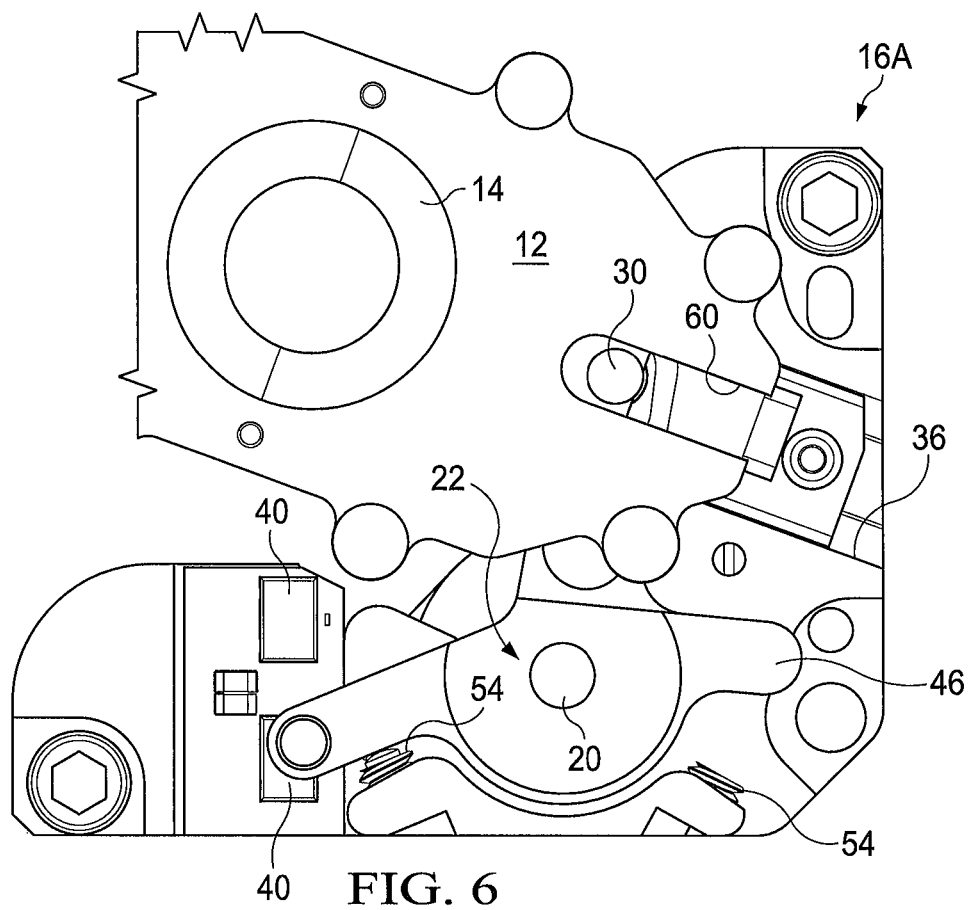
FIG. 6 illustrates the drive arm in a second "full closed" position wherein the shutter slider member is in a corresponding second position.

FIG. 1 illustrates a top perspective view of a IR thermal imaging shutter apparatus 10 including a shutter mechanism comprising a plate 12 and a sliding aperture blade 14 configured to be driven by a pair of drive mechanisms generally shown at 16A and 16B. Each drive mechanism 16A and 16B comprises a rotary motor 18 (see FIG. 3) having a rotatable actuator pin 20 coupled to and driving a balanced rotatable drive crank 22. Each drive crank 22 has a radially extending elongated arm 24 (see FIG. 2), configured to selectively rotate arm 24 between a first "full open" position and a second "full closed" position as shown in FIG. 5 and FIG. 6, as will be discussed shortly. Each arm 24 has a distal end having a recess 26, as shown in FIG. 2, the recess 26 preferably comprising an elongated opening in one preferred embodiment as shown. The recess 26 could also comprise a slot or other open ended structure if desired, and limitation to an opening is not to be inferred. Each arm recess 26 is configured to receive, but is spaced from, a respective actuatable member 30 and roller 34 (see FIG. 4) rotatably disposed thereabout. Each member 30 preferably comprises a shutter pin secured to one respective end of the aperture blade 14 as shown in FIG. 4. Each member 30 is also secured to, and extends downwards towards, a respective slidable magnetic detent latch 32, wherein each detent latch 32 is securingly and slidably received in a respective dovetail slot 35 (see FIG. 2) defined in a frame 36. Each detent latch 32 is preferably comprised of a dovetail plug configured to slide linearly inside the corresponding dovetail slot 35 in frame 36, along with respective shutter pin 30 and roller 34 when manually adjusted, and locked into position when positioned in the final desired location by a set screw 37 pressing the plug 37 upwards into the dovetail slot 35, providing an accessible locking feature while inducing minimal additional linear motion. Upon rotation of the arms 24, the respective openings 26 engage the respective roller 34 encompassing the respective shutter pin 30 to linearly move the aperture blade 14 between a first full open position and a second full closed position, wherein the roller 34 rotates in the opening 26 during transition, and is then spaced therefrom at the end of the transition.

FIG. 2 depicts the apparatus 10 with the shutter plate 12 and aperture blade 14 removed, illustrating the drive mechanisms 16A and 16B including the respective arms 24 having openings 26, the magnetic detent latches 32 without shutter pins 30, as well as a pair of proximity sensors 40 (see FIG. 3) to indicate the final position of the arm, preferably comprised of Hall effect sensors. Each drive crank 22 has a proximity indicating arm 42 including a magnet 44 disposed at a distal end therein and selectively extending over one of the proximity sensors 40 as a function of the arm 24 position. When the arm 24 is in the first full open position as shown in FIG. 5, the first proximity sensor 40 indicates the drive crank 22 is in place at the open position, and when the arm 24 is in the second full closed position as shown in FIG. 6, the second proximity sensor 40 indicates the drive crank 22 is in place at the closed position. Magnetic cogging, created internally to the actuator 18 and in the detent magnetic latch 32, forces the arms 42 and 46 against the set screws 54 in stops 50 and 52 and prevents any play at the end of travel.

Figure 3:
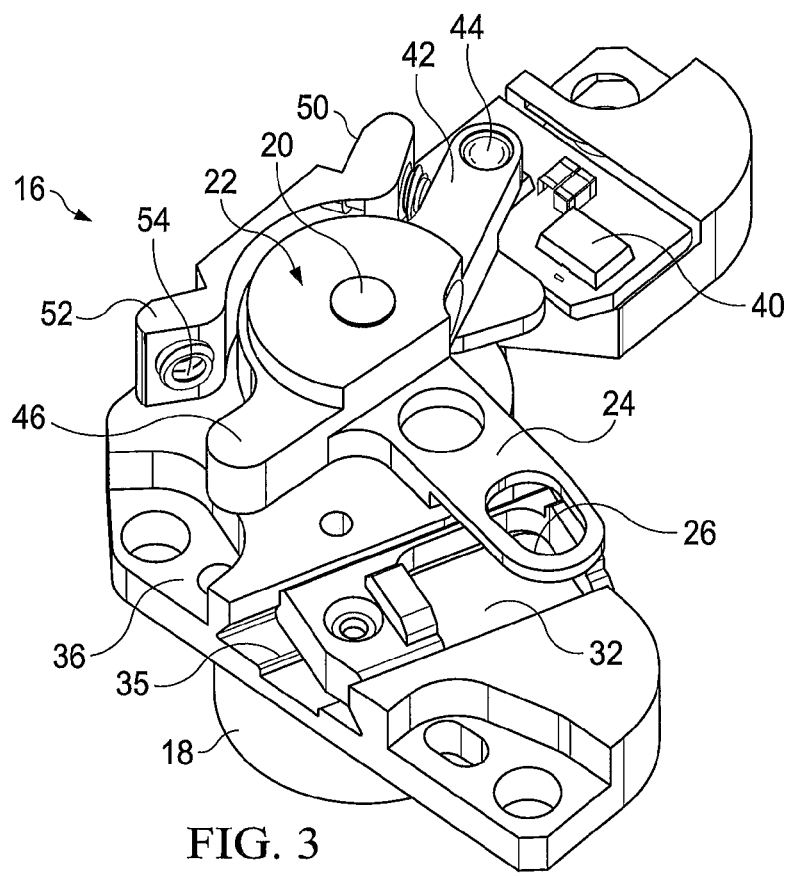
FIG. 3 illustrates a perspective view of one drive mechanism.

FIG. 3 depicts a perspective view of one drive mechanism 16 with arm 24 positioned between the first and second position, illustrating the travel path of the arm, which may be, for instance, 24 degrees, although limitation to this path is not to be inferred.

FIG. 4 depicts an exploded view of one drive mechanism 16 and one end of the shutter plate 14 configured to be positioned as a function of the drive mechanism positions. The shutter pin 30 consists of a cylindrical post which captures roller 34 to prevent sliding along the distal slot 26, and a magnet below provides detent pulling when in close proximity of the shutter pin 30, but not contacting, to the arms of the detent magnetic latch 32.

Figure 9:
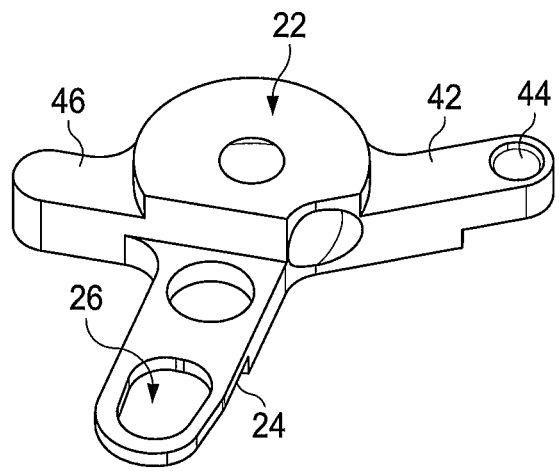
FIG. 9 illustrates a perspective view of the drive crank including the arms.

Each drive crank 22 further comprises a radially extending arm 46, wherein each of arms 42, and 46 are shorter than the elongated arm 24 as shown in FIGS. 5 and 6, as well as FIG. 9. Each of arms 24, 42, and 46 are balanced about the center of the drive crank 22, such that the center of gravity of drive crank 22 is balanced when coupled to the respective actuator pin 20. This makes system 10 far less sensitive to extremely high shock requirements. Each arm 42 and 46 has a travel stop limit comprising a stop member 50 and 52, respectively, of which each contains an adjustable travel limit set screw 54. Stop member limit screws 54 in turn establish the precise travel path and limit of arm 24, and thus the precise limit position of the driven shutter plate 14. Again, proximity sensors 40 indicate whether the drive crank 22, and thus the arm 24 and shutter plate 14, is in one of two positions.

When the shutter plate 14 is in the full open position, the arm 24 of drive mechanism 16A is in the full open position and the shutter pin 30 of drive mechanism 16A is positioned at a distal end of a slot 60 defined in one end of plate 12 as shown in FIG. 5. Correspondingly, the arm 24 of drive mechanism 16B is in the full open position, and the shutter pin 30 of the drive mechanism 16B is outwardly advanced in an opposing slot 60 defined at the opposing end of plate 12. The converse is true when the shutter plate 14 is in the closed position, as can be seen in FIG. 1 and FIG. 6.

Figure 7:
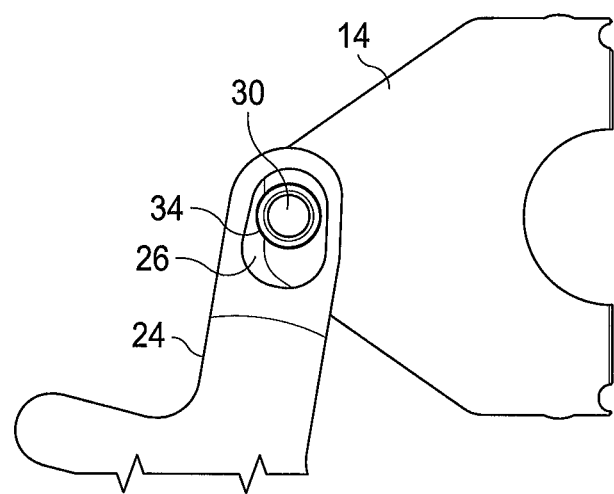
FIG. 7 illustrates a top view of the arm and elongated opening receiving, but physically and thermally separated from, the slider pin and roller in the first and second position.
Figure 8:
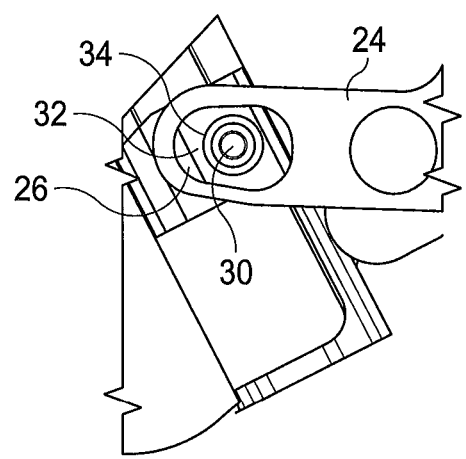
FIG. 8 illustrates a top view of the arm in the first position showing the asymmetric clearance of the arm from the slider pin and roller, including the radial play of the actuator compared to this clearance.

Advantageously, as illustrated in FIG. 7 and FIG. 8, each shutter pin 30 and the corresponding roller 34 remain physically and thermally separated from the respective arm 24 when in the first position and the second position due to a spacing created therebetween in both positions, thus creating a thermal barrier, also referred to as thermal isolation. The arm 24 only engages the rollers 34 disposed about the shutter pin 30 for a very short time period during movement/actuation of the shutter plate 14 from one position to the other. Thus, the drive mechanisms 16A and 16B and all parts thereof are thermally isolated from the driven shutter plate 14 when in the operable full open or full closed position. The shutter mechanism including the plate 12 and shutter plate 14 are preferably configured in a vacuum having a true IR Dewer cryogenic environment.

Moreover, the spacing of the arms 24 from rollers 34 provides the motors 18, and thus the respective arms 24, time to accelerate from the respective first rest position or second rest position which advantageously builds momentum in the arms 24 before engaging and driving the respective rollers 34, converting the actuation mechanism from torque transfer to momentum transfer of energy. This additional momentum helps overcome the magnetic detent forces of the magnetic detent latch 32 acting against the shutter pin 30, holding arms 42 or 46 against the stop posts 50 or 52. The impact of the arm 24 engaging the roller 34 during rotation also helps overcome any stiction that may be present. This spacing increases the required force margin from 25% to 900%. The spacing also allows the use of a less precise solenoid motor 18, which has a relatively large amount of play and thus is less suitable for driving the arm 24 directly. Each arm opening 26 provides a loose fitting about the respective shutter pin 30 and roller 34, such that the motor loose play does not impair operation of the shutter aperture. Conversely, the loose tolerances of the arm openings 26 mitigate the risk of an inadvertent rebound. The aperture blades 14 have internal stops, which engage prior to the holding arms 42 or 46 contacting their respective stop. Since the shutter pin 30 is not firmly engaged within the distal slot 26, the aperture blade can rebound before the arm 42 or 46 contacts the stop set screw 54 and rebounds. Additional margin is provided by the fact that the arm has much higher inertia than the aperture blade, and rebounds correspondingly slower. The high level of damping in the actuator bearings in 18 diminishes the magnitude of the arm rebound. These features prevent a situation where the rebounding arm 24 impacts the shutter pin 30 and roller 34 while traveling in the opposite direction. Such impact could exert extremely high forces onto the shutter pin 30 due to the arm's much higher inertia.

As shown in FIG. 8, the clearance between the respective roller 34 and arm opening 26 is slightly asymmetric, although it may be symmetric if desired. In one preferred implementation, there is about 1.4 degrees of clearance, also referred to as a dead zone, equating to about a 0.011 inch clearance, although limitation to this angular spacing or clearance is not to be inferred. The arm travel limit set stops established by screws 54 are preferably set to detent to within ⅕ of the dead zone, about 0.28 degrees.

In one preferred embodiment, a rotary solenoid is used as motor 18 as it provides consistent reliability and an adjustable stroke, such as manufactured by Brandstrom Instruments of Ridgefield Conn. The fine adjustment features of the drive crank 22 using the travel limit screws 54 in the stationary motor mount stop limit members 50 and 52 help establish this stroke. This design is superior to a piezo drive motor that is inherently unreliable, although is functionally acceptable. Alternate rotary motors could comprise DC stepper motors, and limitation to the particular rotary motor is not to be inferred. This invention has advantages over motors and linkages that may allow motor over-travel which may overstress driven parts.

FIG. 9 illustrates a perspective view of the drive crank 22, including the four balanced arms.

Figure 10:
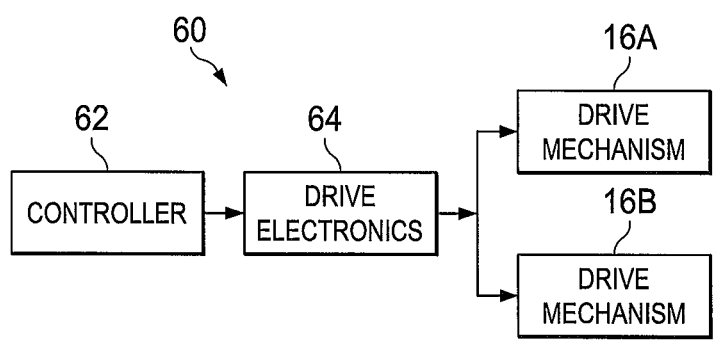
FIG. 10 illustrates a controller circuit configured to control the drive assembly.

FIG. 10 illustrates a control circuit at 60 that is configured to selectively drive each of motors 18, to control the positioning of the arms 24 and thus drive the shutter plate 14 between the first and second positions. The control circuit includes a controller 62 having a processor configured to control drive electronics 64 that interface with motors 18 of drive mechanisms 16A and 16B.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A device comprising:
    a rotary-actuated motor configured to rotatably drive a motor member;
    a drive arm coupled to the motor member and configured to responsively move between a first position and a second position upon rotation of the motor member; and
    an actuatable member configured to be moved by the drive arm, wherein the actuatable member is thermally isolated from the drive arm in both the first position and the second position.

2. The device as specified in claim 1, wherein the drive arm is configured to:
    engage and advance the actuatable member between the first position and the second position and impart movement to the actuatable member; and
    remain physically spaced from the actuatable member in both the first position and the second position.

3. The device as specified in claim 2, wherein:
    the drive arm comprises a recess; and
    at least part of the actuatable member is configured to reside in the recess and remain thermally isolated from the drive arm in both the first position and the second position.

4. The device as specified in claim 3, wherein the actuatable member comprises a pin.

5. The device as specified in claim 3, wherein the drive arm is configured to impart a linear movement to the actuatable member when the drive arm is moved between, the first position and the second position.

6. The device as specified in claim 3, wherein the drive arm is configured to rotate between the first position and the second position.

7. The device as specified in claim 3, wherein the recess comprises an opening.

8. The device as specified in claim 7, wherein the opening is elongated.

9. The device as specified in claim 1, further comprising:
    at least one limit member configured to establish the first position and the second position.

10. The device as specified in claim 9, further comprising:
    at least one adjustment member coupled to the at least one limit member and configured to selectively establish a length of a travel path of the drive arm between the first position and the second position.

11. The device as specified in claim 1, wherein the drive arm is balanced about the motor member.

12. The device as specified in claim 1, further comprising:
    at least one securing mechanism configured to secure the drive arm in each of the first position and the second position.

13. The device as specified in claim 12, wherein the at least one securing mechanism comprises at least one magnet.

14. The device as specified in claim 12, further comprising:
    a pair of sensors configured to sense an actual position of the drive arm.

15. The device as specified in claim 1, further comprising:
    a shutter responsively coupled to the actuatable member, wherein the shutter is thermally isolated from the drive arm.

16. A device comprising;
    a rotary-actuated motor configured to rotatably drive a motor member;
    a drive arm coupled to the motor member and configured to responsively move between a first position and a second position upon rotation of the motor member;
    an actuatable member configured to be moved by the drive arm, wherein the actuatable member is thermally isolated from the drive arm in both the first position and the second position; and
    a shutter responsively coupled to the actuatable member, the shutter configured to have one position when the drive arm is in the first position and another position when the drive arm is in the second position, wherein the shutter is thermally isolated from the drive arm.

17. The device as specified in claim 16, wherein the drive arm is configured to:
    engage and advance the act able member between the first position and the second position and impart movement the actuatable member; and
    remain physically spaced from the actuatable member in both the first position and the second position.

18. The device as specified in claim 17, wherein:
    the drive arm second portion comprises a recess; and
    the at least part of the actuatable member is configured to side in the recess and remain thermally isolated from the drive arm in both the first position and the second position.

19. The device as specified in claim 16, wherein the drive arm is configured to rotate between the first position and the second position.

20. The device as specified in claim 16, further comprising:
at least one limit member configured to establish the first position and the second position; and
at least one securing mechanism configured to secure the drive arm in each of the first position and the second position.

21. A method comprising:
rotatably driving a motor member using a rotary-actuated motor;
moving a drive arm between a first position and a second position using the motor member;
moving an actuatable member using the drive arm; and
thermally isolating the actuatable member from the drive arm in both the first position and the second position.

* * * * *